Aug. 11, 1925.

J. J. CAMPODONICO 1,549,293

TRANSMISSION

Filed Jan. 5, 1921  3 Sheets-Sheet 1

INVENTOR
JOHN J. CAMPODONICO
BY Chas E Townsend
ATTORNEY

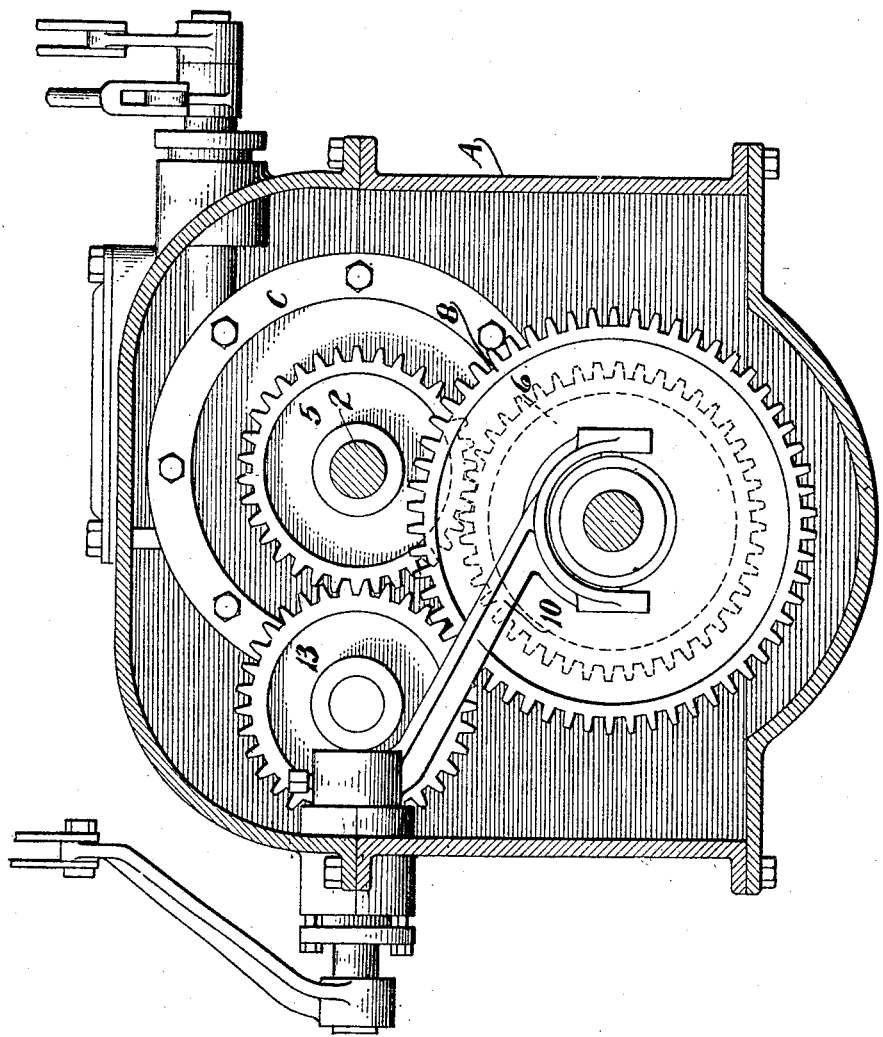

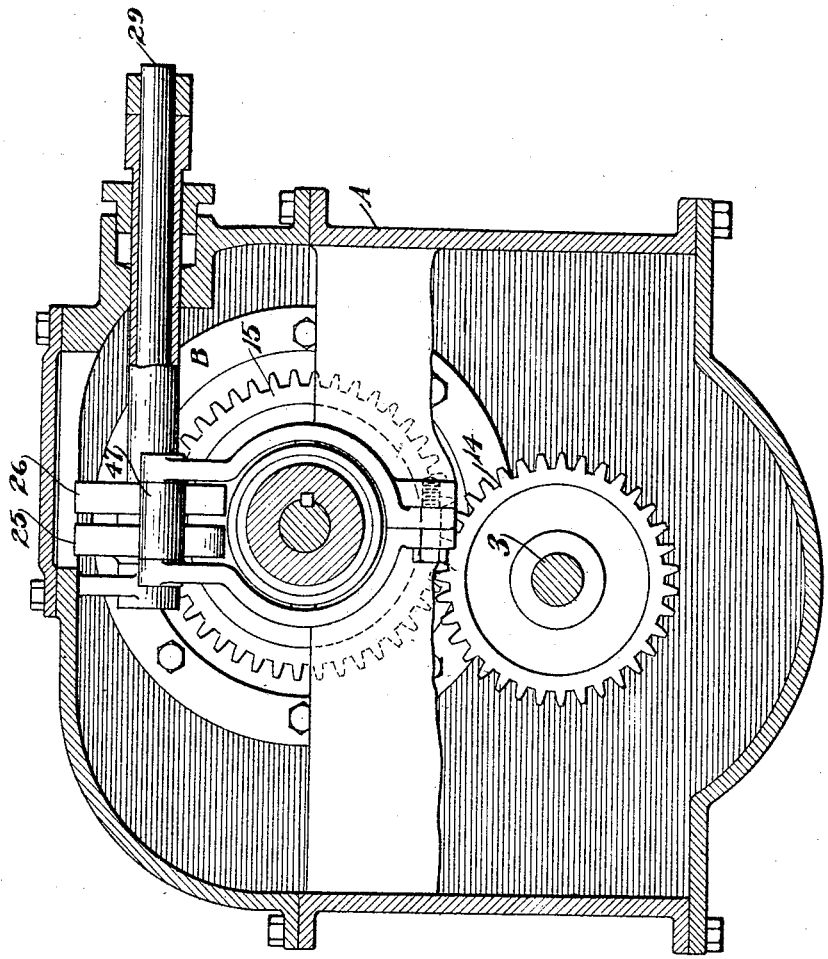

Patented Aug. 11, 1925.

1,549,293

UNITED STATES PATENT OFFICE.

JOHN J. CAMPODONICO, OF STOCKTON, CALIFORNIA.

TRANSMISSION.

Application filed January 5, 1921. Serial No. 435,159.

*To all whom it may concern:*

Be it known that I, JOHN J. CAMPODONICO, a citizen of the United States, residing at Stockton, in the county of San Joaquin and State of California, have invented new and useful Improvements in Transmissions, of which the following is a specification.

This invention relates to a transmission, and especially to a transmission adapted for tractors, trucks and the like.

One of the objects of the present invention is to provide an improved and simplified transmission for tractors, trucks and the like, and particularly a transmission in which the gears remain in constant mesh and in which speed changes either ahead or reverse are obtained.

Another object of the invention is to provide a transmission which embodies a drive, a counter and a propeller shaft, and normally meshing gears on said shaft through which direct and intermediate speeds ahead and reverse movement may be transmitted.

Another object of the invention is to provide a clutch mechanism supported by the propeller shaft and so arranged that reverse movement or intermediate speeds ahead may be transmitted.

Another object of the invention is to provide a single clutch, through which a direct drive may be transmitted between the drive and the propeller shaft.

Further objects will hereinafter appear.

The invention consists of the parts and the construction, combination and arrangement of parts as hereinafter more fully described and claimed, having reference to the accompanying drawings, in which—

Fig. 2 is a cross section showing the position of the reversing gears.

Fig. 3 is a cross section taken on line 3—3, Fig. 1.

Figure 1:
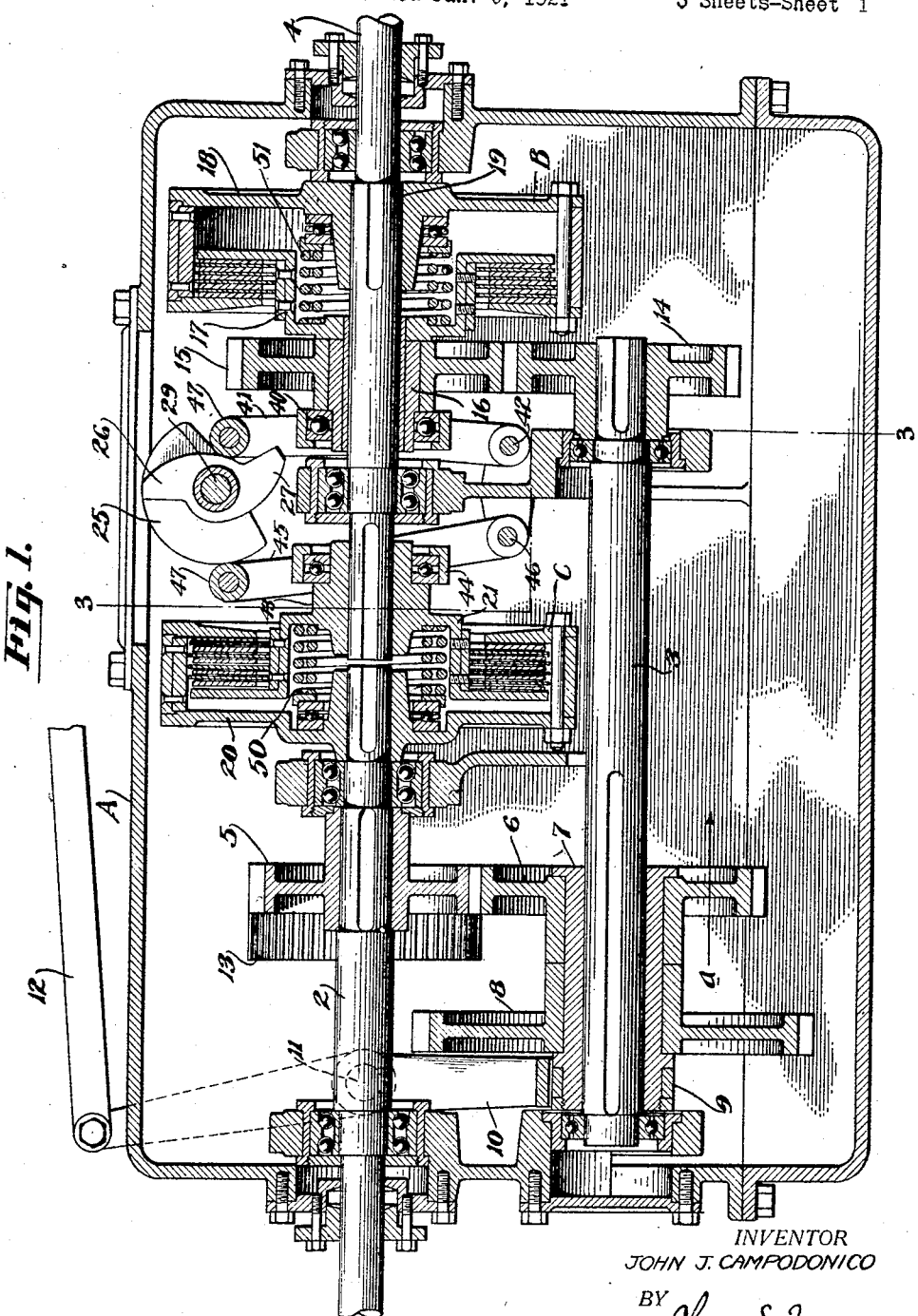
Fig. 1 is a central vertical longitudinal section through the transmission.

Referring to the drawings in detail, and particularly to Fig. 1, A indicates a case of suitable construction in which is journalled a drive shaft 2, a counter shaft 3, and a propeller shaft 4. Keyed or otherwise secured on the drive shaft is a driving gear 5, and mounted on the counter shaft and adapted to intermesh therewith is a gear 6. The gear 6 is keyed or otherwise secured to a sleeve 7 which in turn is keyed to the counter shaft, but slidable thereon. This sleeve carries a second gear 8 which is employed when reverse movement is to be transmitted. The sleeve 7 is provided with a grooved collar on one end, as indicated at 9, which is engaged by an operating lever 10 pivotally mounted on one side of the case, as at 11, said operating lever being connected with a link 12 which is connected with a foot pedal or similar mechanism not here shown. The gear 5 normally meshes with the gear 6. It also meshes with an intermediate gear 13 journalled in one side of the casing with which gear 8 is adapted to intermesh when reverse movements are transmitted; the reverse gearing being similar to that employed in standard practice.

One of the main objects of the present invention is to provide a transmission in which the gears remain in constant mesh when operating under normal conditions. The normal position of the gears 5 and 6 is therefore such as shown, and sliding movement is only transmitted to the sleeve 7, carrying the gears 6 and 8, when reverse movement is to be transmitted. Power transmitted to the counter shaft 3, through the gears 5 and 6, is again transmitted to the propeller shaft 4 through a pair of permanently meshing gears 14 and 15. The gear 15 is secured to a sleeve 16 which is freely turnable on the shaft. This sleeve however carries one part of a clutch 17, which cooperates with a clutch member 18 keyed or otherwise secured to the propeller shaft as at 19. Gear 15 may therefore run free under certain conditions, or may transmit power to the propeller shaft when the clutch members 17 and 18 are thrown into engagement as will hereinafter be described.

The present transmission is designed with the object in view of transmitting a direct drive by connecting the shafts 2 and 4, or to transmit a low speed when power is transmitted through the counter shaft to the gear 15; this drive being also employed when reverse movement is transmitted. In other words the clutch B, which consists of the members 17 and 18, is employed for two purposes, either that of transmitting a low or intermediate speed, or when reverse movement is transmitted. The direct drive is taken care of entirely by a clutch generally indicated at C. This clutch also consists of two sections, one indicated at 20 and one at 21. The section 20 is permanently keyed to the drive shaft 2, while the section 21 is permanently keyed to the inner end of the propeller shaft 4. The clutch section 21 is however slidably mounted on the propeller shaft and as such may be thrown into or out of engagement with the section 20. In other words two clutches only are employed in the present instance, the clutch C when a direct drive is transmitted, and the clutch B when reverse or intermediate speeds are transmitted.

For the purpose of throwing the clutches B and C into or out of engagement, I have provided a cam member 25 and a pair of cam dogs 26 and 27. The clutch B, as previously stated, consists of two sections 17 and 18, the section 17 being supported by the sleeve 16, which also carries the gear 15. Formed on the inner end of the sleeve 16 is a collar 40, and engaging the same is a rocker arm 41 which is pivotally supported in the lower part of the casing as at 42. The clutch C also consists of two sections, 20 and 21; the section 21 being provided with a sleeve-like extension 43, on the inner end of which is secured a collar 44. This collar is engaged by a rocker arm 45, which is also pivotally mounted within the casing as at 46. The rocker arms 41 and 45 are disposed one on each side of the shaft 29, and their upper ends are provided with rollers 47 by which the cam and cam dogs are adapted to be engaged.

In actual operation we will assume that the present transmission is mounted in a tractor; that the driving shaft 2 is suitably connected with the engine and the propeller shaft 4 with the gears, through which power is transmitted to the tractor wheels. With the gears assuming the position shown in Fig. 1, if it is desired to start a comparatively heavy load, it is only necessary to throw in the engine clutch, not here shown, so that power will be transmitted from the engine to the drive shaft. As gears 5 and 6 are meshing, it is obvious that power will be transmitted to the counter shaft, and similarly that power will be transmitted through gears 14 and 15 to the clutch section 17 of clutch B. Clutch B, and also clutch C, are normally held out of engagement by means of the cam members.

By turning the cams in one direction by means of a foot lever (not shown), a rocking movement is transmitted to the rocker arm 41. The movement of the rocker arm will thus permit the spring 51 to expand and the clutch sections 17 and 18 to be thrown into engagement. The moment the clutch sections engage, power will be transmitted to the propeller shaft and a low speed drive will be obtained. After the tractor has gained momentum, and if it is desired to drop into a direct drive, it will again be necessary to depress the foot lever. This will cause the dogs 26 and 27 to engage the rollers on the respective rocker arms 41 and 45, and such engagement will throw the clutch sections 17 and 18 out of engagement.

Further movement releases the rocker arm 45, thus permitting this to move in, and the cooperating clutch C to engage when the foot lever is released, that is, dog 27 temporarily supports the rocker arm 45 in its outer position when the cam 25 is swung out of engagement therewith, but dog 27 moves away from the roller and permits inward movement of the arm 45 and engagement of the clutch C when the foot lever is released. When a direct drive is being transmitted, it can be seen that the counter shaft is merely running idly and that power will be directly transmitted to the shafts 2 and 4 as these will then be connected by means of the clutch C.

If for any reason it becomes necessary to back up, it is obvious that the tractor will first have to be brought to a stop, which is accomplished by disengaging both the clutches B and C. Similarly that it will be necessary to disengage the engine clutch not shown so the drive and counter shaft may come to rest. When this has been accomplished, it will only be necessary to shift the gears 6 and 8 in the direction of arrow *a* by means of the link 12 and lever 10 until gear 8 meshes with the intermediate reversing gear 13. When this position is assumed, it will only be necessary to throw in the engine clutch and then to engage the clutch B, a low speed and a reverse movement being then transmitted.

From the foregoing description it can be seen that a single clutch mounted on the counter shaft is employed for transmitting either a reverse movement or a low speed ahead movement, and that the clutch C is only employed when a direct drive is being transmitted. Similarly it should be seen that shifting of gears under normal conditions when driving ahead is not required as the gears 5 and 6 are then permitted to remain in mesh, in fact shifting of the gears is only resorted to when reversing, and as it is necessary to bring the tractor and the several transmission shafts to a stop before a reverse movement can be transmitted, it is obvious that the shifting of the gears will take place without any danger of injury to the same.

Having thus described my invention, what I claim and desire to secure by Letters Patent is—

1. A transmission comprising a casing, a drive, a counter and a propeller shaft journalled therein, said drive and propeller shaft being mounted in alignment, a gear keyed on the drive shaft, an intermediate gear journalled in the casing with which said gear constantly meshes, a pair of gears slidably mounted on the counter shaft, one adapted to mesh with the drive shaft gear, and the other with the intermediate reverse gear, a gear fixed on the counter shaft, a gear meshing therewith and freely turnable on the propeller shaft, and a clutch mechanism on the propeller shaft cooperating with said gear and adapted to form a driving connection between the gear and the propeller shaft, said clutch and gear being operable whether driving ahead or reverse.

2. A transmission comprising a casing, a drive, a counter and a propeller shaft journalled therein, a gear keyed to the drive shaft, a gear keyed to the counter shaft, a gear freely turnable on the propeller shaft and intermeshing with the last named gear, clutch means for securing or releasing the gear on the propeller shaft, a second clutch mechanism adapted to form a direct driving connection between the drive shaft and the propeller shaft when the other clutch is released, and a sliding gear on the counter shaft adapted to be moved into or out of mesh with the fixed gear on the drive shaft.

3. A transmission comprising a casing, a drive, a counter and a propeller shaft journalled therein, a gear keyed to the drive shaft, a gear keyed to the counter shaft, a gear freely turnable on the propeller shaft and intermeshing with the last named gear, clutch means for securing or releasing the gear on the propeller shaft, a second clutch mechanism adapted to form a direct driving connection between the drive shaft and the propeller shaft when the other clutch is released, a sliding gear on the counter shaft adapted to be moved into or out of mesh with the fixed gear on the drive shaft, an intermediate gear journalled in the casing and meshing with the fixed gear on the drive shaft, and a second sliding gear on the counter shaft adapted to be moved into or out of mesh with the intermediate gear.

JOHN J. CAMPODONICO.